(12) United States Patent
Venkatasubramanian et al.

(10) Patent No.: US 10,237,747 B2
(45) Date of Patent: Mar. 19, 2019

(54) APPARATUS AND METHOD REALIZING A COGNITIVE ENABLER FOR UNLICENSED BAND COMMUNICATION USING LICENSED FEEDBACK IN MULTI-BAND RADIO CHANNELS

(71) Applicant: Fraunhofer-Gesellschaft zur Foerderung der angewandten Forschung e.V., Munich (DE)

(72) Inventors: Venkatkumar Venkatasubramanian, Berlin (DE); Thomas Haustein, Potsdam (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 0 days.

(21) Appl. No.: 15/081,287

(22) Filed: Mar. 25, 2016

(65) Prior Publication Data
US 2016/0212627 A1 Jul. 21, 2016

Related U.S. Application Data

(63) Continuation of application No. PCT/EP2014/070611, filed on Sep. 26, 2014.

(30) Foreign Application Priority Data

Sep. 27, 2013 (EP) .................................... 13186351

(51) Int. Cl.
H04W 16/14 (2009.01)
H04L 5/00 (2006.01)
(Continued)

(52) U.S. Cl.
CPC ............. *H04W 16/14* (2013.01); *H04L 5/001* (2013.01); *H04L 5/0055* (2013.01);
(Continued)

(58) Field of Classification Search
None
See application file for complete search history.

(56) References Cited

U.S. PATENT DOCUMENTS

2006/0121854 A1* 6/2006 Abhishek .............. H04W 16/10
455/63.1
2010/0029216 A1* 2/2010 Jovicic ................. H04B 7/2615
455/68
(Continued)

FOREIGN PATENT DOCUMENTS

CN 101267383 A 9/2008
CN 101273646 A 9/2008
(Continued)

*Primary Examiner* — Eunsook Choi
(74) *Attorney, Agent, or Firm* — Perkins Coie LLP; Michael A. Glenn

(57) ABSTRACT

An apparatus for receiving data includes a data receiver for receiving the data, wherein the data is transmitted in a first channel by a first transmission. Moreover, the apparatus includes a transmit information transmitter for transmitting transmission information in a second channel by a second transmission. The transmission information is control information depending on the first transmission, or the transmission information is channel quality information indicating a channel quality of the first channel. The second channel is different from the first channel. Moreover, an apparatus for transmitting data and a system are provided.

7 Claims, 5 Drawing Sheets

(51) Int. Cl.
    *H04L 27/00*         (2006.01)
    *H04W 76/15*        (2018.01)
    *H04L 1/16*           (2006.01)
    *H04L 5/14*           (2006.01)
    *H04W 88/06*        (2009.01)

(52) U.S. Cl.
    CPC .......... *H04L 5/0057* (2013.01); *H04L 5/0078* (2013.01); *H04L 27/0006* (2013.01); *H04W 76/15* (2018.02); *H04L 1/1607* (2013.01); *H04L 5/0037* (2013.01); *H04L 5/1469* (2013.01); *H04W 88/06* (2013.01)

(56) References Cited

U.S. PATENT DOCUMENTS

| | | |
|---|---|---|
| 2011/0028102 A1 | 2/2011 | Li et al. |
| 2011/0149941 A1 | 6/2011 | Gong et al. |
| 2011/0255579 A1 | 10/2011 | Eguchi et al. |
| 2011/0287794 A1 | 11/2011 | Koskela et al. |
| 2013/0322277 A1* | 12/2013 | Vanganuru ............ H04W 24/08 370/252 |

FOREIGN PATENT DOCUMENTS

| | | |
|---|---|---|
| EP | 1233564 A1 | 8/2002 |
| EP | 1667372 A1 | 6/2006 |
| JP | 2006186992 A | 7/2006 |
| JP | 2007214920 A | 8/2007 |
| JP | 2010219791 A | 9/2010 |
| JP | 2011530216 A | 12/2011 |
| JP | 2013501402 A | 1/2013 |
| JP | 2013515436 A | 5/2013 |
| KR | 1020110030623 A | 3/2011 |
| WO | 2011017035 A1 | 7/2010 |

\* cited by examiner

APPARATUS AND METHOD REALIZING A COGNITIVE ENABLER FOR UNLICENSED BAND COMMUNICATION USING LICENSED FEEDBACK IN MULTI-BAND RADIO CHANNELS

CROSS-REFERENCE TO RELATED APPLICATIONS

This application is a continuation of copending International Application No. PCT/EP2014/070611, filed Sep. 26, 2014, which claims priority from European Application No. 13186351.6, filed Sep. 27, 2013, which are each incorporated herein in its entirety by this reference thereto.

The present invention relates to unlicensed band communication and, in particular, to an apparatus and a method which realize a cognitive enabler for unlicensed band communication using licensed feedback in multi-band radio channels.

BACKGROUND OF THE INVENTION

Unlicensed band communication becomes increasingly important. Examples for unlicensed band communication are wireless networks, e.g., commercial wireless networks, which can operate in unlicensed bands called "Unlicensed National Information Infrastructure" (U-NII) bands.

A popular standard example of wireless networking in unlicensed bands is Wireless LAN-Wi-Fi, IEEE 802.11 (a/b/g/h/j/n). Currently operations bands in Europe are 2.412 GHz to 2.472 GHz, 5.24 GHz to 5.680 GHz. These current wireless LAN (local area network) standards operate in time division duplexing (TDD).

However it is possible in the future that even some licensed bands will be temporarily accessed by secondary operators, making them effectively unlicensed at the physical layer.

In order to enable an efficient link operation, the physical layer (PHY layer) needs to transfer channel state information from the receivers to the sender.

The channel state information of a time division duplexing (TDD) unlicensed band can be estimated via the principle of reciprocity, in which case the channel feedback is conveyed implicitly. However the reliability of this information is arguably unclear.

Otherwise explicit feedback information is by the receiver to the transmitter upon a request from the transmitter, wherein the time slots need to be acquired by the transmitter.

On the other hand, enhanced physical layer concepts such as multi-user MIMO (MIMO=Multiple Input Multiple Output) are already in place for many wireless systems and hence could be utilized for unlicensed band communication. For this purpose, the channel quality or precoding information for multi-user MIMO would have to be made from multiple devices within a short period of time.

Currently for MAC (Media Access Control) operation in unlicensed bands such as in wireless LAN collision avoidance mechanisms by request to send (RTS) and clear to send signals (CTS) are transmitted by the receiver and transmitter respectively. Packet acknowledgments (ACK) are sent in the unlicensed band time-shared with the data payload. In addition, devices can transmit network allocation vector (NA V) in order to reserve the medium which will then be used for transmitting important information such as ACK and HARQ (Hybrid Automatic Repeat Request) packets.

Drawbacks are, for example, that the data transmission of another unexpected wireless link can adversely interfere with the control signaling of the ongoing wireless link in unlicensed band. Moreover, to suppress this interference, channel contention is needed also for control packets. Furthermore, channel quality from each device also needs to done separately in time, thus worsening the problem for multi-user MIMO communication. Moreover, even if the channel quality is conveyed, it has to be received with high reliability at the transmitter. To further complicate things, when the channel is available upon contention, a transmitter can transmit only one or the other (i.e., either control, data or channel quality) at a given time.

SUMMARY

According to an embodiment, a system may have an apparatus for transmitting data, and two apparatuses for receiving the data, wherein the apparatus for transmitting the data may have: a data transmitter for transmitting the data in a first channel, being an unlicensed spectrum band, by a first transmission, and a transmit information receiver for receiving transmission information in a second channel, being a licensed spectrum band, by a second transmission, wherein the transmission information is control information depending on the first transmission, or the transmission information is channel quality information indicating a channel quality of the first channel, and wherein the second channel is different from the first channel; and wherein each of the two apparatuses for receiving the data may have: a data receiver for receiving the data from the apparatus for transmitting the data, and a transmit information transmitter for transmitting the transmission information in a second channel to the apparatus for transmitting the data, wherein the two apparatuses for receiving the data are adapted to transmit their transmission information at the same time to the apparatus for transmitting the data.

According to another embodiment, a method may have the steps of: transmitting, by an apparatus for transmitting data, data in a first channel, being an unlicensed spectrum band, by a first transmission, and receiving the data from the apparatus for transmitting the data by each of two apparatuses for receiving the data, wherein each of the two apparatuses for receiving the data transmits the transmission information in a second channel, being a licensed channel, to the apparatus for transmitting the data, wherein the second channel is different from the first channel, wherein the apparatus for transmitting the data receives the transmission information in a second channel, being a licensed spectrum band, by a second transmission, wherein the transmission information is control information depending on the first transmission, or the transmission information is channel quality information indicating a channel quality of the first channel, and wherein the two apparatuses for receiving the data transmit their transmission information at the same time to the apparatus for transmitting the data.

According to another embodiment, a non-transitory digital storage medium may have a computer program stored thereon to perform the inventive method when said computer program is executed by a computer or signal processor.

An apparatus for receiving data is provided.

The apparatus comprises a data receiver for receiving the data, wherein the data is transmitted in a first channel by a first transmission.

Moreover, the apparatus comprises a transmit information transmitter for transmitting transmission information in a second channel by a second transmission. The transmission information is control information depending on the first transmission, or the transmission information is channel quality information indicating a channel quality of the first channel.

The second channel is different from the first channel.

In an embodiment, the first channel may be located in an unlicensed spectrum band and wherein the second channel is located in a licensed spectrum band.

According to an embodiment, the unlicensed spectrum band may be an ISM spectrum band. The licensed spectrum band may be an LTE band, a UMTS band or a GPRS band.

In an embodiment, the transmit information transmitter is configured to transmit a packet acknowledgement (ACK) signal, indicating that the data has been received, or a request to send (RTS) signal, indicating that further data shall be sent, as the transmission information in the second channel.

Moreover, an apparatus for transmitting data is provided.

The apparatus comprises a data transmitter for transmitting the data in a first channel by a first transmission.

Furthermore, the apparatus comprises a transmit information receiver for receiving transmission information in a second channel by a second transmission. The transmission information is control information depending on the first transmission, or the transmission information is channel quality information indicating a channel quality of the first channel.

The second channel is different from the first channel.

According to an embodiment, the first channel may be located in an unlicensed spectrum band and wherein the second channel is located in a licensed spectrum band.

In an embodiment, the unlicensed spectrum band may be an ISM spectrum band. The licensed spectrum band may be an LTE band, a UMTS band or a GPRS band.

According to an embodiment, the transmit information receiver may be configured to receive a packet acknowledgement (ACK) signal, indicating that the data has been received, or a clear to send (RTS) signal, indicating that further data shall be sent, as the transmission information in the second channel.

Furthermore, a system is provided. The system comprises an apparatus according to an embodiment for transmitting data and an apparatus according to an embodiment for receiving data.

The data transmitter of the apparatus for transmitting data is configured to transmit the data in a first channel by a first transmission. The data receiver of the apparatus for receiving data is configured to receive the data. The transmit information transmitter of the apparatus for receiving data is configured to transmit transmission information in a second channel by a second transmission, wherein the transmission information is control information depending on the first transmission, or the transmission information is channel quality information indicating a channel quality of the first channel. The transmit information receiver of the apparatus for transmitting data is configured to receive the transmission information.

The second channel is different from the first channel.

According to an embodiment, the system may comprise the apparatus for receiving data as a first terminal. The system may further comprise another apparatus for receiving data as a second terminal. The transmit information transmitter of the first terminal may be configured to transmit first transmission information in the second channel. The transmit information transmitter of the second terminal is configured to transmit second transmission information in the second channel. Thus, the first transmission information and the second transmission information is transmitted in the same channel, namely the second channel.

In an embodiment, the system may further comprise a further apparatus for receiving data as a third terminal. The transmit information transmitter of the first terminal is configured to transmit first transmission information in the second channel. The transmit information transmitter of the third terminal is configured to transmit third transmission information in the third channel, being different from the first channel and second channel.

Moreover, a method for receiving data is provided. The method comprises:

Receiving the data, wherein the data is transmitted in a first channel by a first transmission. And:

Transmitting transmission information in a second channel by a second transmission.

The transmission information is control information depending on the first transmission, or the transmission information is channel quality information indicating a channel quality of the first channel. The second channel is different from the first channel.

Furthermore, a method for transmitting data is provided. The method comprises:

Transmitting the data, wherein the data is transmitted in a first channel by a first transmission. And:

Receiving transmission information in a second channel by a second transmission, The transmission information is control information depending on the first transmission, or the transmission information is channel quality information indicating a channel quality of the first channel. The second channel is different from the first channel.

Moreover, a method is provided. The method comprises:

Transmitting the data in a first channel by a first transmission.

Receiving the data.

Transmitting transmission information in a second channel by a second transmission, wherein the transmission information is control information depending on the first transmission, or the transmission information is channel quality information indicating a channel quality of the first channel. And:

Receiving the transmission information.

The second channel is different from the first channel.

Moreover, a computer program for implementing the above-described method when being executed on a computer or signal processor is provided.

Embodiments provide a communication protocol for a radio architecture supporting multiband terminals in a cognitive radio set up. A multi-band radio terminal is one which can transmit and receive on multiple bands simultaneously for communication. In doing so, the device may access some multiple bands which may be unlicensed and operate on time division duplexing (TDD) and some other bands which may be licensed and operate on frequency division duplexing (FDD). The device may be accessing the licensed spectrum as an overlay based on white spaces in spectrum, e.g. digital dividend band.

Embodiments provide a protocol solution to exploit this dual unlicensed and licensed band communication scenario. For example, embodiments provide concepts for reliable transmission of control signaling to better manage radio resources of unlicensed band. Moreover, embodiments provide concepts for reliable channel quality feedback of the unlicensed band. So that feedback is less susceptible to interference and at the same time capable of providing faster channel updates. Furthermore, embodiments provide concepts for improving efficiency in packet retransmission mechanism (e.g., ACK, NACK, HARQ).

Embodiments relate to physical (PHY) and medium access control (MAC) of the unlicensed band terminals. On most wireless networks, it is usually the task of the MAC layer to better utilize wireless resources when multiple terminals wish to access a given set of frequency bands, while the PHY can adapt to the transmission possibilities.

However, the operation of MAC in unlicensed bands can be exceptionally difficult because a framework for organization of unlicensed band terminals can be difficult to accomplish in real-time. Embodiments provide a communication method which can act as a basis for the development of such a framework.

BRIEF DESCRIPTION OF THE DRAWINGS

Embodiments of the present invention will be detailed subsequently referring to the appended drawings, in which.

DETAILED DESCRIPTION OF THE INVENTION

Figure 2:
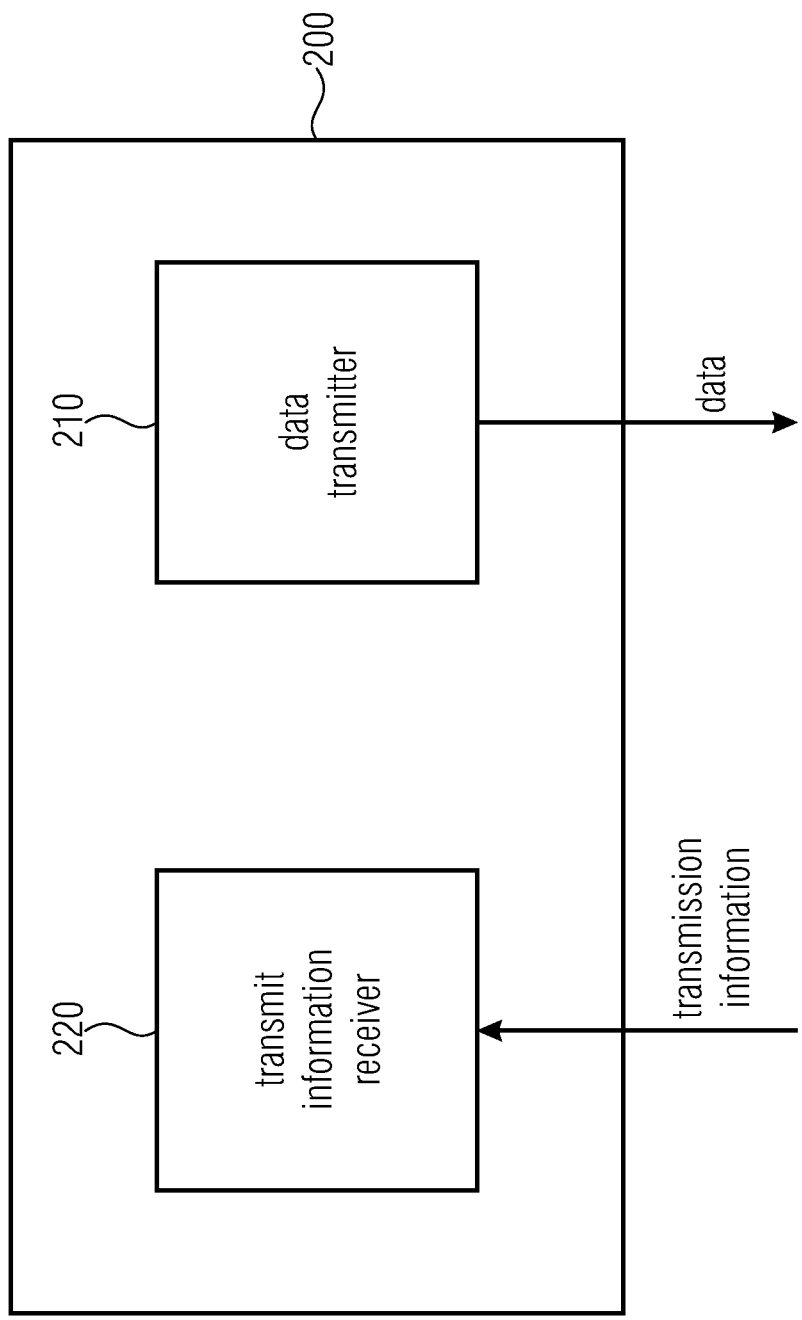
FIG. 2 is an apparatus for transmitting data according to an embodiment.

FIG. 2 illustrates an apparatus 200 for transmitting data according to an embodiment.

The apparatus 200 comprises a data transmitter 210 for transmitting the data. The data transmitter 210 is configured to transmit the data in a first channel by a first transmission.

Furthermore, the apparatus 200 comprises a transmit information receiver 220 for receiving transmission information. The transmission information is transmitted in a second channel by a second transmission. The transmission information is control information depending on the first transmission, or the transmission information is channel quality information indicating a channel quality of the first channel.

The second channel is different from the first channel. In other words, the data transmitted in the first transmission is transmitted in a different channel than channel in which the transmission information is received.

According to an embodiment, the first channel may be located in an unlicensed spectrum band and wherein the second channel is located in a licensed spectrum band. In other words, the data is transmitted in an unlicensed spectrum band and the transmission information is transmitted in a licensed spectrum band.

In an embodiment, the unlicensed spectrum band may be an ISM spectrum band. The licensed spectrum band may be an LTE (Long Term Evolution) band, a UMTS (Universal Mobile Telecommunications System) band or a GPRS (General Packet Radio Service) band.

The transmission information is channel quality information indicating a channel quality of the first channel in which the data has been send, or, the transmission information is control information depending on the first transmission. Control information may, for example be a packet acknowledgement (ACK) signal, indicating that the data has been received, or a clear to send (RTS) signal, indicating that further data shall be sent, as the transmission information in the second channel.

The data, that is transmitted in the first channel, may, for example, be user data.

Figure 1:
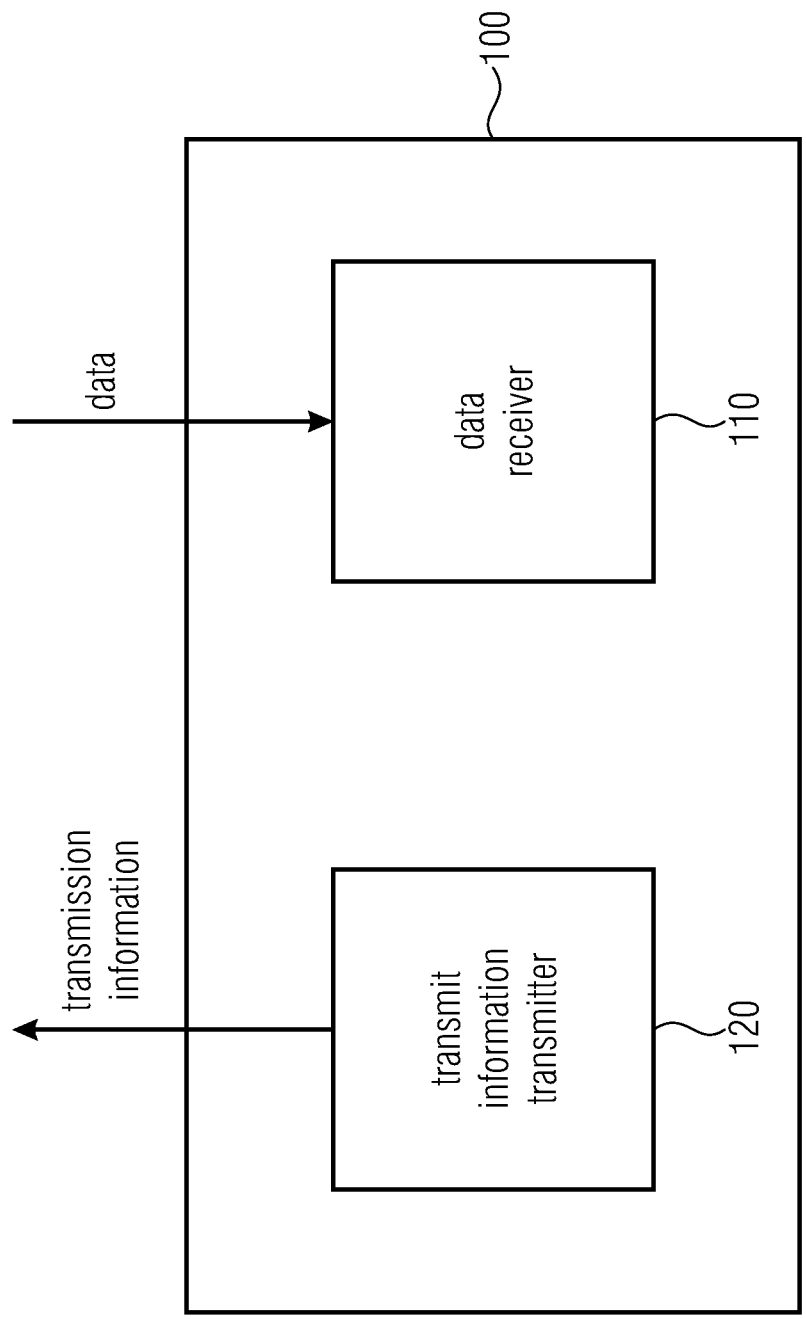
FIG. 1 is an apparatus for receiving data according to an embodiment.

FIG. 1 illustrates an apparatus 100 for receiving data according to an embodiment.

The apparatus 100 comprises a data receiver 110 for receiving the data. The data is transmitted in a first channel by a first transmission.

Moreover, the apparatus 100 comprises a transmit information transmitter 120 for transmitting transmission information. The transmit information transmitter 120 is configured to transmit the transmission information in a second channel by a second transmission. The transmission information is control information depending on the first transmission, or the transmission information is channel quality information indicating a channel quality of the first channel.

The second channel is different from the first channel.

In an embodiment, the first channel may be located in an unlicensed spectrum band and wherein the second channel is located in a licensed spectrum band.

According to an embodiment, the unlicensed spectrum band may be an ISM spectrum band. The licensed spectrum band may be an LTE band, a UMTS band or a GPRS band.

In an embodiment, the transmit information transmitter 120 is configured to transmit a packet acknowledgement (ACK) signal, indicating that the data has been received, or a request to send (RTS) signal, indicating that further data shall be sent, as the transmission information in the second channel.

Figure 3:
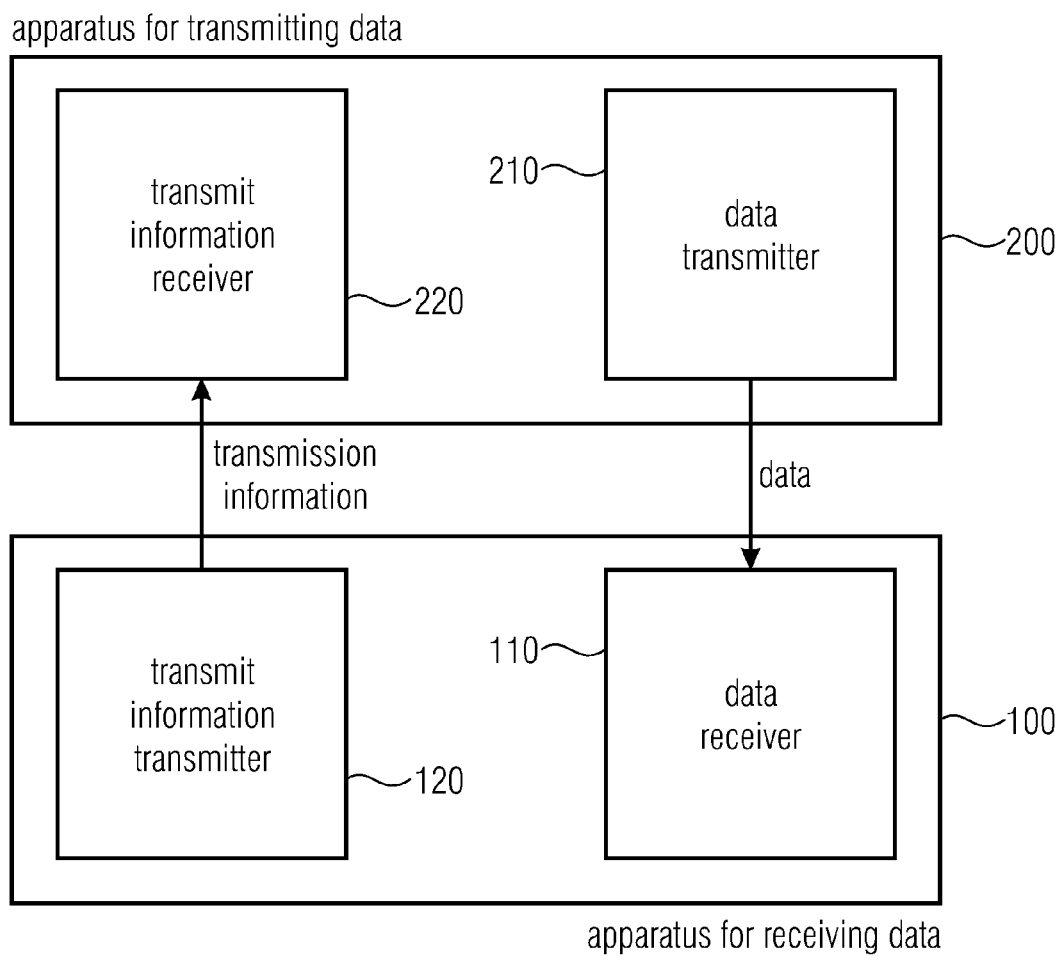
FIG. 3 is a system according to an embodiment.

FIG. 3 illustrates a system according to an embodiment.

The system comprises an apparatus 200 according to an embodiment for transmitting data and an apparatus 100 according to an embodiment for receiving data.

The data transmitter 210 of the apparatus for transmitting data 200 is configured to transmit the data in a first channel by a first transmission. The data receiver 110 of the apparatus for receiving data 100 is configured to receive the data.

The transmit information transmitter 120 of the apparatus 100 for receiving data is configured to transmit transmission information in a second channel by a second transmission, wherein the transmission information is control information depending on the first transmission, or the transmission information is channel quality information indicating a channel quality of the first channel.

The transmit information receiver 220 of the apparatus 200 for transmitting data is configured to receive the transmission information. The second channel is different from the first channel.

According to an embodiment, the system may comprise the apparatus for receiving data as a first terminal. The system may further comprise another apparatus for receiving data as a second terminal. The transmit information transmitter of the first terminal may be configured to transmit first transmission information in the second channel. The transmit information transmitter of the second terminal is configured to transmit second transmission information in the second channel. Thus, the first transmission information and the second transmission information is transmitted in the same channel, namely the second channel.

In an embodiment, the system may further comprise a further apparatus for receiving data as a third terminal. The transmit information transmitter of the first terminal is configured to transmit first transmission information in the second channel. The transmit information transmitter of the third terminal is configured to transmit third transmission information in the third channel, being different from the first channel and second channel.

According to embodiments, the control signals (a kind of transmission information) corresponding to the communication links in unlicensed spectrum are separated at the baseband unit of the devices and sent via different frequency bands in different radio frequency chains (RF chains) utilizing frequencies which are specifically licensed. Some of the widely used unlicensed spectrum bands for wireless networks currently are the ISM bands 2.4 GHz, 5.2 GHz (ISM=Industrial, Scientific and Medical), while licensed bands could be the 2.6 GHz LTE band. Some of the licensed frequencies could belong to well-known cellular bands or be an overlay white space access by cognitive devices.

Thus, embodiments provide an efficient operation as follows: while data transmission continues in TDD/unlicensed mode based on RTS/CTS mechanism, the feedback and control data which convey channel quality, channel allocation information and RTS/CTS signaling itself are done via licensed channels in frequency division multiplexing mode simultaneously. E.g., Feedback and control data are transmission information.

The transmission and reception of multiple frequency bands at the WLAN access points and receivers can be envisioned to be enabled by device hardware which supports simultaneous operation of multiple licensed and unlicensed bands. Such a communication concept is depicted in the figure below, where downlink control and uplink control are performed in FDMA using paired license spectrum while the data communication is done in unlicensed band.

In the state of the art, MAC protocols rely on a contention based mechanism for medium access in the unlicensed band. In contention based mechanism, the aim is to allocate the transmission bandwidth to one user and access point at a time. A wireless LAN network with many users typically utilizes carrier sensing mechanism along with RTS and CTS signaling.

The mechanism of the state of the art has the drawback that a wireless LAN access point transmits to only one user at a time and, moreover, has the further drawback that two nearby access points cannot reuse the frequency band. For example, if two adjacent access points were manually set to channel 11, only one of the two would gain access at a time instance based on a first entry basis.

To overcome the limitation of the state-of-the-art MAC protocols, which rely on a contention based mechanism for medium access in the unlicensed band, within the proposed protocol, embodiments provide channel quality feedback through out of band signaling (in licensed bands) from both WLAN terminals and access points.

Figure 4:
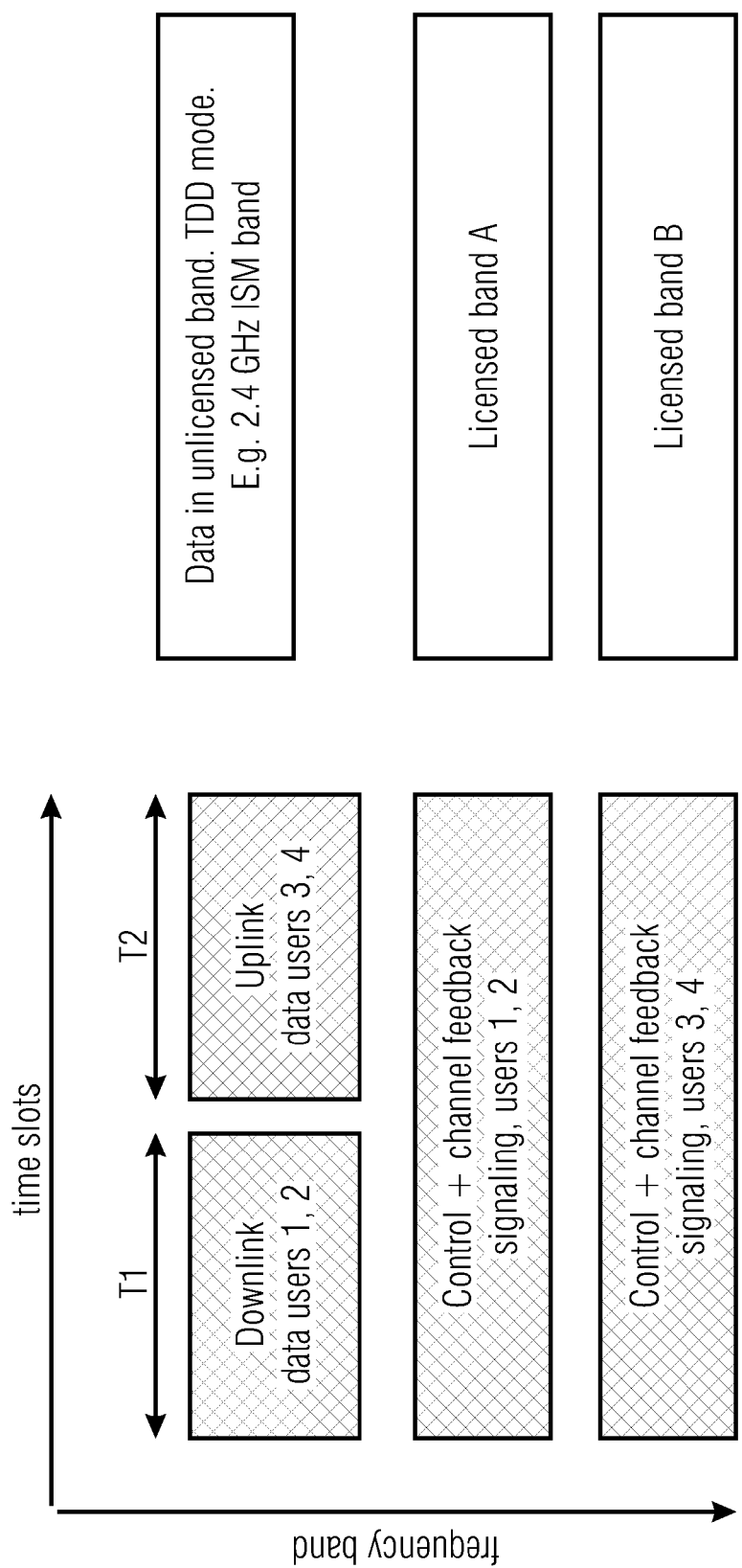
FIG. 4 illustrates an FDD feedback method in multi-band radio for TDD unlicensed bands according to an embodiment.

FIG. 4 illustrates an FDD feedback method in multi-band radio for TDD unlicensed bands according to an embodiment.

According to embodiments, e.g., according to the embodiment of FIG. 4, channel feedback is provided.

Embodiments enable multi-user downlink transmission in existing and future unlicensed spectrum; where in multi-user transmission refers to the concept of OFDMA (Orthogonal Frequency-Division Multiple Access), by simultaneously transmitting to multiple users in a given OFDM symbol (OFDM=Orthogonal frequency-division multiplexing).

FIG. 4 illustrates this possibility, wherein users 1 and 2 can receive downlink data at the same time.

In FIG. 4, the data is for the (user) terminal 1 and for (user) terminal 2 is transmitted in a first channel.

The transmission information (control and channel feedback), however, for the (user) terminal 1 and the (user) terminal 2 is transmitted in a second channel. For user terminal 1 and user terminal 2, the transmission information is transmitted in the same second channel.

However, the transmission information for terminal 3 and 4 is transmitted in a different third channel.

The same licensed feedback mechanism can also be exploited for performing multi-user MIMO to users 1, 2 and users 3, 4 in unlicensed bands.

A further benefit of this licensed feedback protocol is that while even though some other nearby transmitters may potentially interfere with an ongoing transmission of data, the communication can be maintained based on knowledge of interference levels and channel quality. This knowledge of interference levels and channel quality are conveyed with high reliability using licensed spectrum.

Thus while adjacent access points may interfere, the information about modulation and coding that can be supported on the sub-bands of a frequency band is reliably passed to their associated access points.

Figure 5:
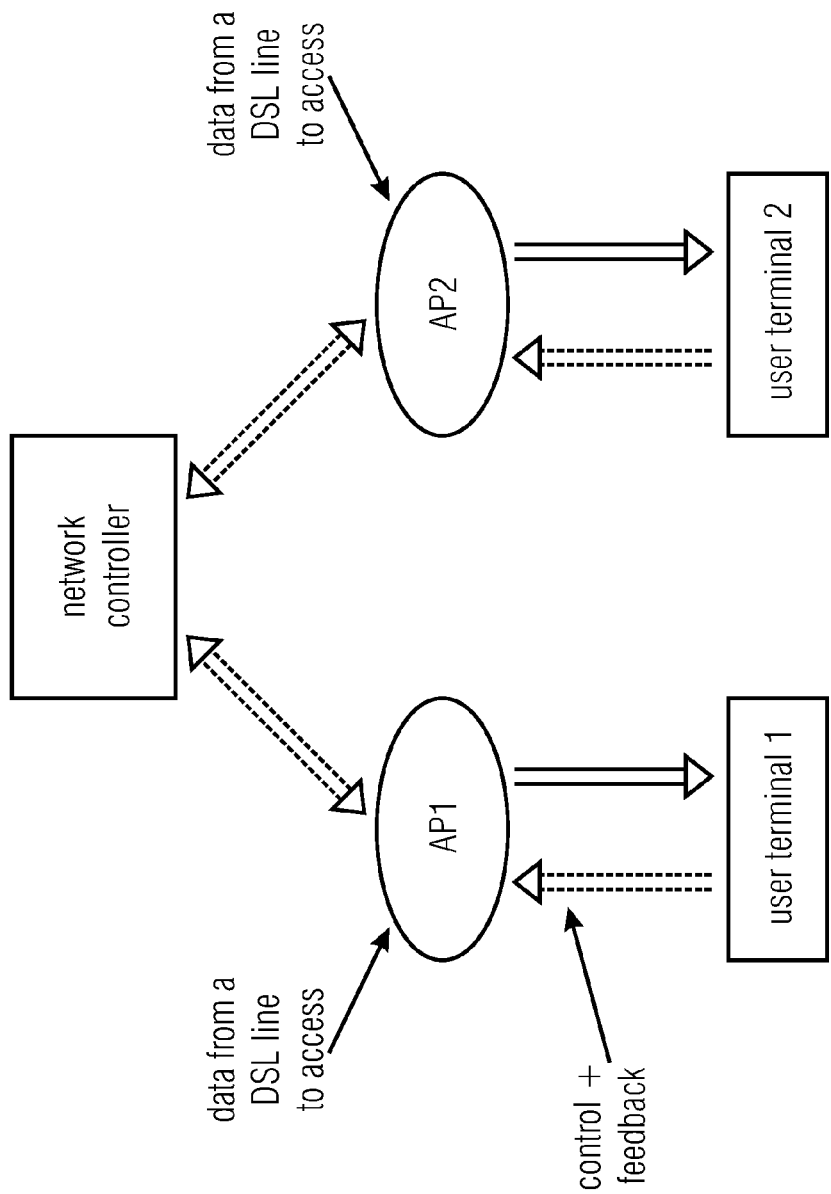
FIG. 5 illustrates a radio network depicting the coordination between two wireless LAN networks via a cellular base station.

FIG. 5 illustrates a radio network depicting the coordination between two wireless LAN networks via a cellular base station. The dashed lines represent communication on the licensed spectrum for feedback and control signaling for data to be sent in unlicensed band. The continuous lines show data sent on unlicensed band.

In FIG. 5, a network controller, access points (AP1, AP2) and user terminals (User Terminal 1, User Terminal 2) are illustrated, wherein, for example, each of them may be implemented as an apparatus for receiving data as described above or as an apparatus for transmitting data as described above.

One of the new features in the architecture, as shown in the figure, is, e.g., that many devices communicate the feedback to their respective access points (AP1, AP2) via licensed frequency channels at the same time. A further enhancement is shown to this approach by conveying the feedback not only available to the access point but also to the nearby network controller, e.g., because the network controller can also listen to those frequencies without interference. The network controller in turn can act as a coordinator between the access points by communicating on the same aforementioned licensed bands.

The feedback and control data that is transmitted from a wireless LAN equipment in a licensed band may comprise one or more of the following:

Control: RTS/CTS signaling, User authentication mechanism (example, the authentication and key agreement protocol), application layer related information (segment 祠, the priority of the service), quality of service attributes, terminal synchronization related information.

Feedback: Quantized or complete channel information, modulation and coding values, ACK/NACK feedback, cyclic redundancy check (CRC) for encoded data packets, parity bits for hybrid automatic-repeat request (H-ARQ), packet deadline time stamps.

The described embodiments provide significant advantages. For example, collisions of ACK/NACK of data are avoided. Moreover, he feedback of channel quality in frequency sub-bands can enable multi user scheduling and multi-user MIMO in unlicensed bands at access points. Furthermore, the reliability of feedback and control data is improved because of interference coordination in the licensed band. Moreover, higher spectral efficiency is used in interference-free licensed channels for sending feedback data.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive decomposed signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention.

It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A system comprising an apparatus for transmitting data, and two apparatuses for receiving the data,
   wherein the apparatus for transmitting the data comprises:
   a data transmitter for transmitting the data in a first channel, being an unlicensed spectrum band, by a first transmission, and
   a transmit information receiver for receiving transmission information in a second channel, being a licensed spectrum band, by a second transmission,
   wherein the transmission information is control information depending on the first transmission, or the transmission information is channel quality information indicating a channel quality of the first channel, and
   wherein the second channel is different from the first channel; and
   wherein each of the two apparatuses for receiving the data comprises:
   a data receiver for receiving the data from the apparatus for transmitting the data, and
   a transmit information transmitter for transmitting the transmission information in a second channel to the apparatus for transmitting the data,
   wherein the two apparatuses for receiving the data are adapted to transmit their transmission information at the same time to the apparatus for transmitting the data.

2. A system according to claim 1, wherein the unlicensed spectrum band is an ISM spectrum band.

3. A system according to claim 1, wherein the licensed spectrum band is a UMTS band.

4. A system according to claim 1, wherein the licensed spectrum band is an LTE band.

5. A system according to claim 1,
   wherein the transmit information transmitter of each of the two apparatuses for receiving the data is configured to transmit a packet acknowledgement signal, indicating that the data has been received, or a request to send signal, indicating that further data shall be sent, as the transmission information in the second channel, and
   wherein the transmit information receiver of the apparatus for transmitting the data is configured to receive a packet acknowledgement signal, indicating that the data has been received, or a clear to send signal, indicating that further data shall be sent, as the transmission information in the second channel.

6. A method comprising:
   transmitting, by an apparatus for transmitting data, data in a first channel, being an unlicensed spectrum band, by a first transmission, and
   receiving the data from the apparatus for transmitting the data by each of two apparatuses for receiving the data,
   wherein each of the two apparatuses for receiving the data transmits the transmission information in a second channel, being a licensed channel, to the apparatus for transmitting the data, wherein the second channel is different from the first channel,
   wherein the apparatus for transmitting the data receives the transmission information in a second channel, being a licensed spectrum band, by a second transmission,
   wherein the transmission information is control information depending on the first transmission, or the transmission information is channel quality information indicating a channel quality of the first channel, and wherein the two apparatuses for receiving the data transmit their transmission information at the same time to the apparatus for transmitting the data.

7. A non-transitory digital storage medium having a computer program stored thereon to perform the method according to claim 6 when said computer program is executed by a computer or signal processor.

* * * * *